(No Model.)
F. E. KOHLER.
POST HOLE DIGGER.
No. 325,212. Patented Aug. 25, 1885.
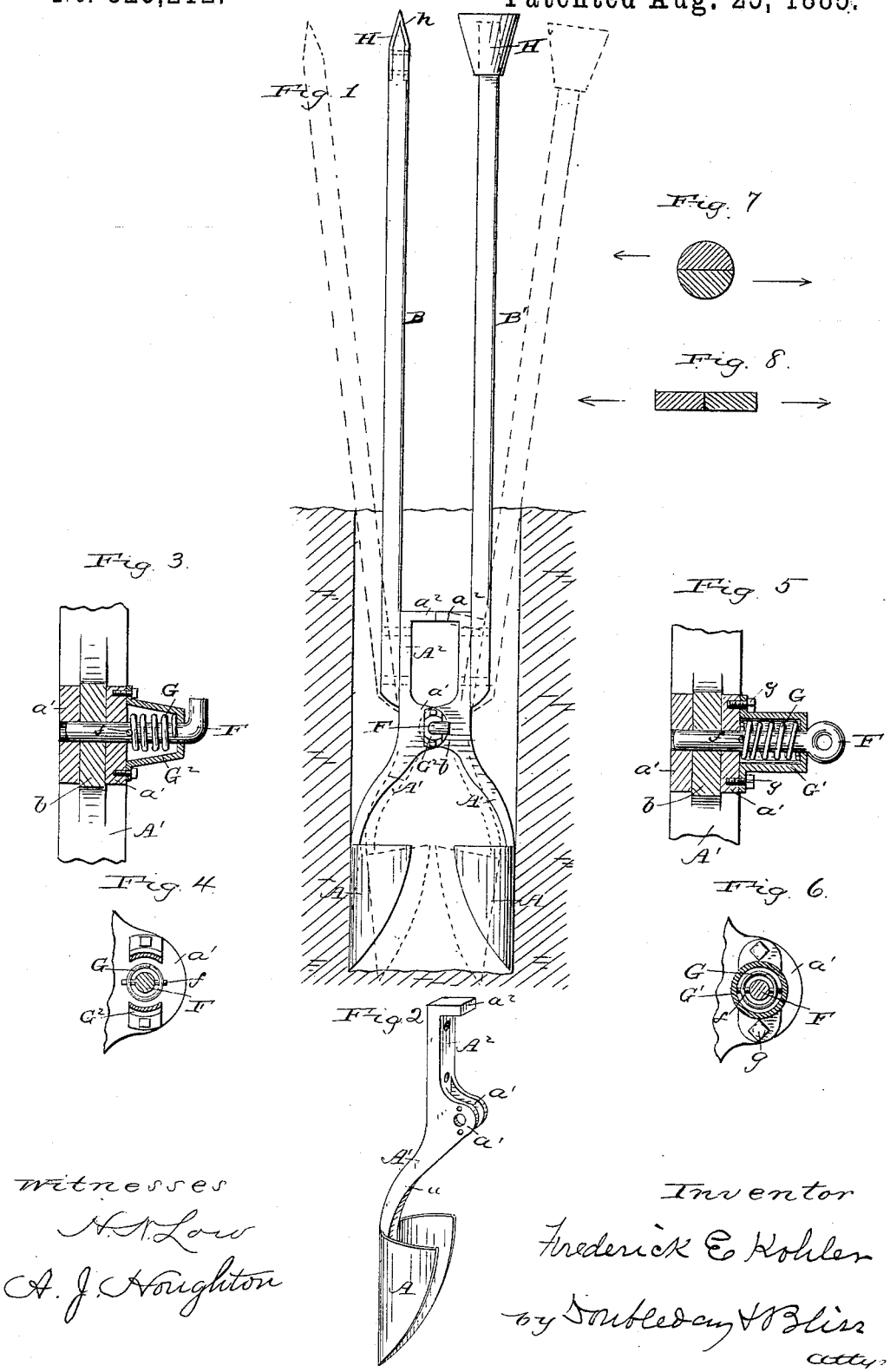
Witnesses
H. N. Low
A. J. Houghton
Inventor
Frederick E. Kohler
by Doubleday & Bliss
attys

UNITED STATES PATENT OFFICE.

FREDERICK E. KOHLER, OF CANTON, OHIO.

POST-HOLE DIGGER.

SPECIFICATION forming part of Letters Patent No. 325,212, dated August 25, 1885.

Application filed March 20, 1883. (No model.)

*To all whom it may concern:*

Be it known that I, FREDERICK E. KOH-LER, a citizen of the United States, residing at Canton, in the county of Stark and State of Ohio, have invented certain new and useful Improvements in Post-Hole Diggers, of which the following is a specification, reference being had therein to the accompanying drawings.

Figure 1 is a side elevation of a post-hole digger embodying my improvement. Fig. 2 is a perspective of one of the connecting-arms detached. Figs. 3 and 4 are sectional views of details in Fig. 1. Figs. 5 and 6 show a modification of that in Fig. 4. Figs. 7 and 8 illustrate the positions of the handles of diggers heretofore made when the parts are ready for insertion.

In the drawings, A A represent shovels or spade portions of the implement, they being preferably of the shape shown—that is to say, concavo-convex—though they may be more nearly semicircular than those shown, or of any suitable character. With each of the shovels there is formed, or to each there is rigidly attached, an arm or bar, A', which is of the peculiar shape and character shown. One is struck up or forged to have the part $a$, which is united with the shovel, the inwardly-projecting flanges or ears $a'$ $a'$, and the upwardly-projecting plate or bar $A^2$, adapted to be secured to the inside of the handle B, there being also formed therewith a stop, as at $a^2$, integral with the part $A^2$. The other connecting part has but one ear, $b$, adapted to be pivoted between the ears $a'$ $a'$. These ears are pivotally connected by a pin, F, in such manner that the shovels can be swung toward and from each other in the same plane. Heretofore it has been quite common to make diggers of this character with handles of such nature as to fold tightly together, the relative positions of the handles when closed being substantially as is shown in Fig. 7. They are in this position when the shovels are being inserted, and when it is desired to compress the earth between them they are forced apart at the upper end. When the handles are arranged as shown in the last said figure, it is a matter of great difficulty to separate them, especially as the separation is resisted by the earth between the shovels. Another style of diggers of this general class has had handles arranged as shown in Fig. 8, when they were closed, the plane of movement of the handles being indicated by the arrows. Trouble and inconvenience are experienced in operating diggers of this class, also, from the fact that the operator's hands are in danger of being caught between the handles when they are coming together, and owing to the further fact that it is difficult to get them apart when it is desired to compress the earth between the shovels.

I avoid the objections above alluded to by arranging the handles at considerable distance from the center, preventing them from coming into direct contact with each other above the pivot. Each is adapted to be grasped separately by a hand of the operator, so that when the shovels are being inserted, the implement can be managed with sufficient ease and force, and when the handles are to be separated to compress the earth, it can be done without danger of accident to the hands of the operator and with comparative ease; but at the same time I do not bring the handles so far out from the center as to have them over the planes of the blades—that is to say, they are situated inside of the vertical planes of the blades when the latter are opened to the utmost. In this respect my implement differs from the transplanting-tools that have been heretofore used—shown, for instance, in the patent of J. C. Bowman, No. 199,501, January 22, 1878. In the transplanting implements of that class there has been no necessity to drive the blades to any distance below the surface of the ground, and therefore they could be constructed with the handles and other parts lying in or even outside of the vertical planes of the shovels. In transplanting implements of this class the handles, in fact, have been situated directly in the vertical planes of the shovels, and as a result there is no clear path for all the parts of the tool if the blade $c$ were to be driven somewhat below the surface, for one or another of the parts at the lower end of the implement will necessarily strike the edges of the hole formed by the blades. My implement, having the handles (while not being at the center to endanger the operator's hands or make the operation difficult) inside of the vertical planes of the shovels, can be inserted to a considerable depth and manipulated with ease in a comparatively deep hole.

The two stops $a^2$ $a^2$ are opposed to each other above the pivot-pin, and are adapted to strike together when the handles are brought toward each other. Again, they act as a stop or shoulder upon which the operator can place his foot in driving down the blades after the hole has been carried to a considerable depth.

One of the handles is at the upper end shaped suitably to permit its being used for loosening stones or other obstructions. I prefer to construct it for this purpose as shown— that is, I taper the sides at the upper end to a comparatively sharp point, as shown at H, and then I rivet or otherwise secure thereto a flat steel point, $h$, this being made of a band or strip of flat steel welded at the center to form a sharp strong point. This produces an implement of substantially the character of a crow-bar. The other handle, B', is at the other end provided with a device for stamping or packing the earth. Preferably it consists of a piece of metal, H', having an aperture extending through it, by means of which it can be fitted or fastened to the upper end of the handle, there being a wedge to crowd the parts together.

In order to use the parts of the implement separately for the purposes last above indicated, it becomes desirable to have them instantly separable, though at the same time it is necessary to have them fastened firmly when they are to be used together. To attain this end I pivot them by an elongated pin, F, and combine therewith a coiled spring, G, having one end secured to or arranged to bear against a stationary part of the implement, and having its other end fastened to or arranged to bear longitudinally against the pivot-pin F. The spring tends to hold the pin in position; but, as will be readily seen, it can be instantly withdrawn to allow the handles to be separated. After they are separated, either can be used as a shovel or spade. One can be used as a crow-bar, and the other can be used for stamping or packing the earth. When it is required to again join the parts together, it is only necessary to withdraw the pin F partially from its seat, inserting the ear $b'$ between the ears $a'$ $a'$, and then allow the spring to again force the pin through the ears.

In Fig. 5 I have shown the spring G as being mounted and concealed within a socket-piece, G', which is fastened by screws $g$, and which provides an abutment for the spring, there being a pin, $f$, through the large pin F, against which the inner end of the spring bears.

In Figs. 1 and 3 I have shown a modification of this retaining device, it consisting of a loop or stirrup, $G^2$, having an aperture through which passes the pin F, the spring operating in this case substantially the same as in that described.

Many of the advantages incident to my implement are owing to the fact (in addition to the one mentioned, that they are arranged to swing directly toward and from each other without crossing) that the pivot is below the handles, and that the metallic arms A' are bent inwardly to converge toward the pivotal point. Constructing the parts and arranging them relatively to each other thus enables me to provide an implement of great strength with but few parts, compactly and commodiously arranged. A strong abutment, it will be seen, is provided above the pivotal point for the handles, the latter bearing directly against each other, and yet, by means of the stops or abutments, being held sufficiently far apart for convenient manipulation.

I am aware of the fact that use has been made in making post-hole diggers of wooden handles bent to have portions thereof lie in contact and to have other portions situated some distance apart at the upper end, and I do not claim such devices as my invention; but by making the handles in the manner I have shown I avoid the expense involved in manufacturing them in the way above mentioned, the wooden parts of the handles in my case being unbent, and, moreover, greatly strengthened by having the metallic connecting-pieces and stops arranged as shown and described.

In Fig. 1 are shown in full and dotted lines the relative positions of the parts and the advantages of operation, which will be readily understood.

What I claim is—

1. In a post-hole digger, the combination of the opposing shovels, the metallic connecting-arms A A', curved inwardly and provided with the stops $a^2$ at the upper ends, the pivot which directly joins said metallic arms below said stops, and the straight wooden handles secured to the outside of the metallic connecting-pieces above the pivot, said parts being arranged, substantially as set forth, to have the handles swing toward and from each other in the same plane and to be held apart by the metallic connecting-pieces and the stops above the pivots, they being, when the shovels are in parallelism, situated on straight lines throughout their entire length between the vertical planes of the shovels and the central vertical line, substantially as set forth.

2. In a post-hole digger, the combination, with the shovels and the wooden handles, of the herein-described connecting devices, each having the inward-projecting pivoting-ear, the upward-projecting plate or arm $A^2$ above the pivot-ear, the inward-projecting stop $a^2$ at the upper end of said plate, and the outward-curved part A' for direct attachment to the shovel, all the parts of said connecting device being formed integrally in one piece, substantially as set forth.

3. In a post-hole digger, the combination, with the shovels and the wooden handles swinging in the same transverse plane, and having their lower ends situated on vertical lines between the vertical center of the device and the vertical lines of the shovels, of the connecting-arms A', one having two inward-projecting pivot ears, and each connecting-arm having a plate, A², rising above its pivot ear and formed with an inward-projecting stop and an outward and downward curved bar, $a$, adapted to be riveted directly to a shovel, substantially as set forth.

In testimony whereof I affix my signature in presence of two witnesses.

FREDERICK E. KOHLER.

Witnesses:
JOHN C. WELTY,
J. W. ALBAUGH.